Feb. 17, 1942. A. DREYER 2,273,027
METHOD AND APPARATUS FOR MAKING FLEXIBLE METAL TUBING
Filed Nov. 1, 1939
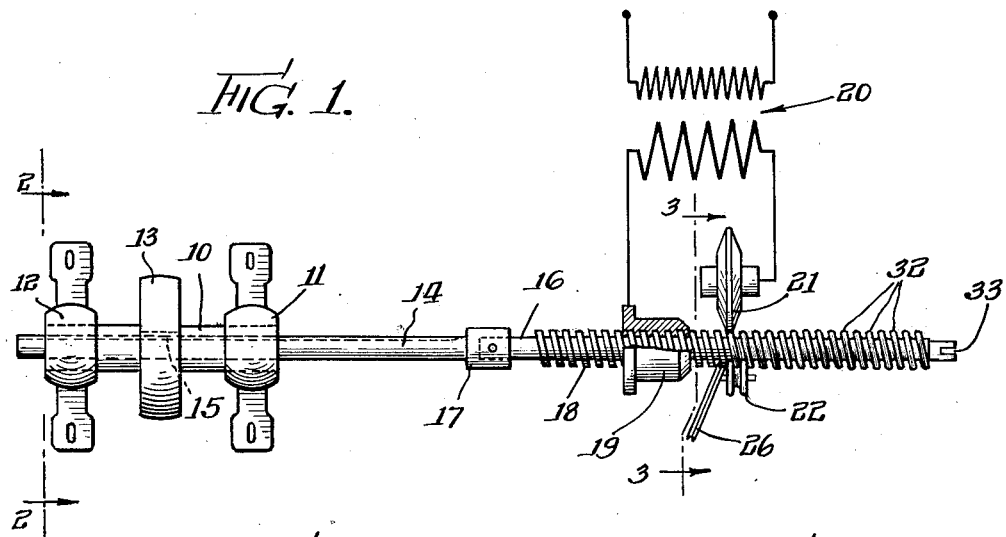
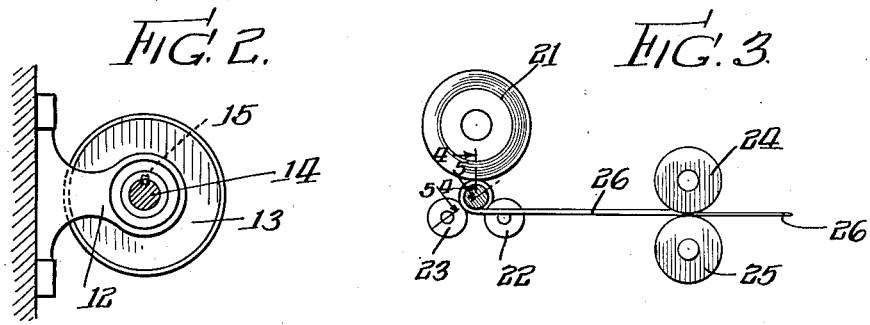
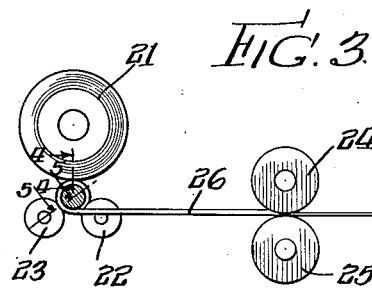
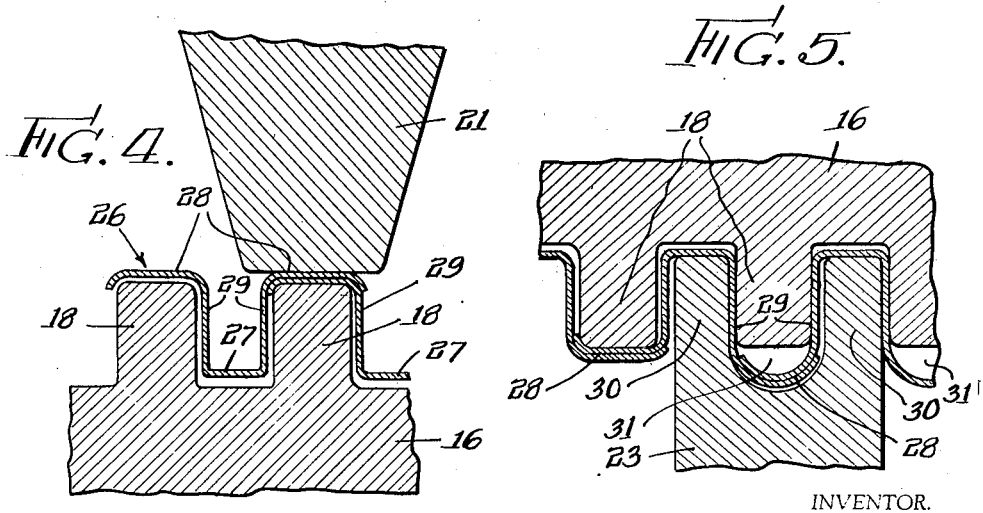
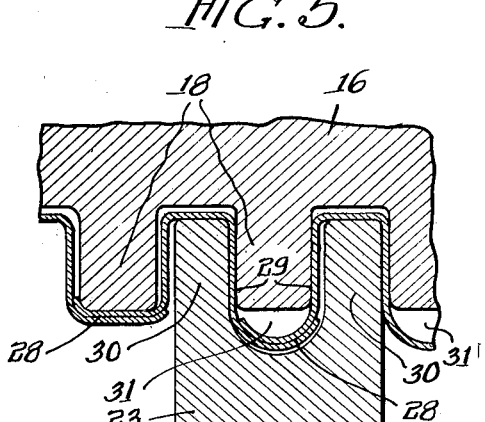
INVENTOR.
Albert Dreyer
BY: Cox & Moore
ATTORNEYS.

Patented Feb. 17, 1942

2,273,027

UNITED STATES PATENT OFFICE 2,273,027

METHOD AND APPARATUS FOR MAKING FLEXIBLE METAL TUBING

Albert Dreyer, Lucerne, Switzerland, assignor to Chicago Metal Hose Corporation, Maywood, Ill., a corporation of Illinois Application November 1, 1939, Serial No. 302,308 In Switzerland November 21, 1938

11 Claims. (Cl. 219—6)

This invention relates to methods and apparatus for making flexible metal tubing, and particularly tubing of the helical or spirally wound welded type.

It is an object of the invention to provide improved methods and apparatus for making flexible metal tubing, which are adapted for the making of convoluted tubing in long lengths, of increased elasticity, and of metals such, for example, as stainless steel and Monel metal which are not suited for drawing operations or for welding by gases. In accordance with the invention a suitably profiled elongated metal strip is helically or spirally wound upon a profiled arbor, the edges of adjacent strip convolutions being brought into overlapping relation and welded by the electro-welding process.

Further objects of the invention are to provide, in the making of tubing of the foregoing type, means for facilitating the removal of the completed tubing from the profiled arbor, means for increasing the life of the welding electrodes, and means for precluding stressing or weakening of various sections of the tubing convolutions during the welding and formation processes, whereby to provide a tubing of increased strength, quality and durability.

Other and more specific objects, features and advantages of the invention will be apparent from the following description when taken in connection with the accompanying drawing wherein a preferred embodiment is set forth for purposes of illustration.

In the drawing, wherein like reference numerals refer to like parts throughout:

Fig. 1 is an assembly view, generally diagrammatic in form, of apparatus suitable for the production of tubing in accordance with the principles of the invention.

Fig. 2 is a sectional view of the apparatus of Fig. 1 on the line 2—2 thereof.

Fig. 3 is a sectional view of the apparatus of Fig. 1 on the line 3—3, and

Figs. 4 and 5 are detailed sectional views of the apparatus on an enlarged scale, and taken on the lines 4—4 and 5—5, respectively, of Fig. 3.

Referring more specifically to the drawing, the apparatus illustrated comprises a rotatable sleeve 10 journaled in bearing brackets 11 and 12, and adapted to be driven from a pulley wheel or the like 13. The pulley wheel may be rigidly mounted upon the sleeve to effect the driving relation. Any suitable means such as a belt or the like (not shown) may be employed for driving the pulley wheel. A shaft 14 is mounted within the sleeve 10, the sleeve and shaft being provided with a key and slot connection as indicated at 15, Fig. 2, whereby the shaft may be driven by the sleeve, but the shaft being free for slidable movement relative to the sleeve.

The shaft 14 is adapted to drive an arbor 16 by means of a coupling connection 17, the arbor being profiled or provided with a continuous helical projection or screw thread 18. A stationary support member 19 is provided for supporting the arbor, the internal bore of the support member being threaded to conform to the arbor screw thread 18 whereby as the arbor is rotated within the support it will be moved longitudinally in one direction or the other depending upon the direction of arbor rotation. The support member is electrically connected to one branch of the secondary of a suitable welding transformer generally indicated by the numeral 20, the other branch of the secondary being electrically connected to a rotatable electrode roller 21 adapted to be urged into pressure engagement with the arbor at the welding station.

As best shown in Figs. 1 and 3, a pair of calibrating rollers 22 and 23 are provided underneath the arbor and on either side thereof adjacent the welding station. The apparatus also includes a pair of profiling rollers 24 and 25, Fig. 3, by means of which the strip which is to be spirally wound and welded into tubing form is profiled prior to being wound upon the welding arbor.

In the operation of the apparatus, as the pulley wheel 13 is driven to drive the sleeve 10, the shaft 14 and its connected arbor 16 will be rotatably driven. Due to the threaded bore of the support member 19, as the arbor is rotated it will also be translated longitudinally relative to the support, depending upon the direction of arbor rotation, thereby causing the shaft 14 to be similarly longitudinally translated but without disturbing the key and slot driving connection with the sleeve 10.

The elongated strip 26, Fig. 3, which is to be wound and welded into tubing form may be drawn from any suitable source of supply such as a supply drum (not shown). On its way to the welding station it is drawn between the profiling rollers 24 and 25. These profiling rollers may be provided with cooperating profiled peripheral surfaces whereby as the strip is drawn between the rollers it will be shaped into general U cross section as shown for example in Fig. 4. More specifically the strip is formed with a trough portion 27 and a pair of crest portions 28, the trough and crest portions being connected by side wall portions 29.

From the profiling rollers, the profiled strip is wrapped helically onto the arbor 16 in the manner best shown in Fig. 1, the crest edges 28 of adjacent strip convolutions being brought into overlapping relation. At the welding station, Fig. 4, the overlapped strip edges are brought beneath the welding roller 21 whereby the edges are permanently welded together into convoluted tubing form. The welding current passes from the welding roller 21 through the strip edges to be welded, into the arbor 16 and back to the welding transformer through the screw threaded support member 19. Obviously the strip can pass from the profiling rollers directly onto the arbor and to the welding station, as above described, or if desired intermediate guiding rollers may be provided for insuring the proper directing of the strip onto the arbor and its proper placement in helical position thereon. It is to be noted, see Fig. 4, that the strip is so shaped or profiled with respect to the profiling on the arbor that as the strip is transmitted to and through the welding station, the side walls 29 thereof are spaced from the adjacent sides of the arbor screw thread 18, whereas the crest strip edges 28 are in firm engagement with the top of the arbor screw thread.

As the strip leaves the welding station it passes through the calibrating rollers 22 and 23. As best shown in Fig. 5, these calibrating rollers are provided with profiling projections 30 which cooperate with the screw thread or profiling 18 of the welding arbor in a manner so that the side walls 29 of the tubing strip are compressed into engagement with the side walls of the arbor screw thread. This movement of the side walls causes the crest portions of the strip to be moved away or free from the top of the screw thread thereby forming a free space between the screw thread and the tubing as indicated at 31 in Fig. 5, to facilitate removal of the tubing from the arbor as will be later described. In the particular embodiment illustrated two calibrating rollers are employed, but obviously additional calibrating rollers may be provided, if desired, to insure the calibration of the tubing to the desired shape. The calibrating rollers not only shape the tubing convolutions for removal purposes, as described, but also serve as a support means for absorbing the pressure of the welding roller 21 against the arbor. During the welding process the forward axial movement of the arbor corresponds to the pitch of its screw thread 18 so that while the welding roller 21 and the calibrating rollers 22 and 23 rotate, they experience no axial movement.

The continuous rotation of the arbor causes the completed tubing 32 to be formed on the right end thereof, as shown in Fig. 1, and the process may be continued until the end of the screw thread 18 reaches the stationary support member 19. The rotation of the arbor is then stopped and the end of the completed tubing is gripped in any suitable manner, for example by gripping clamps or jaws. With the tubing so held the arbor may then be reversely rotated whereby to cause it to be threadedly withdrawn from the tubing. If a longer length of tubing is desired, the reverse rotation of the arbor is stopped before the arbor is completely withdrawn from the tubing, and upon a resumption of arbor rotation in the forward direction, with the tubing rotating therewith, welding operations may be resumed. This process may be repeated successively until the desired length of tubing is obtained. The completed tubing may be directed from the arbor into any suitable receiving means such as a channel or pipe or it can be wound upon a receiving drum. In the event a drum is used, the drum will be rotatable with the arbor during the welding operation, and on reverse arbor rotation the drum may be held stationary whereby to hold the tubing, thus dispensing with the use of separate tube gripping clamps or jaws. To start the making of a piece of tubing the strip 26 may be suitably threaded by hand through the various rollers and around the arbor, the end of the strip being initially secured to the arbor end in any suitable manner such, for example, as in the slot 33.

The foregoing method serves as a satisfactory means for making flexible metal hose in any desired length, and by means of the process metals such as stainless steel, Monel metal and the like which are not suited to drawing or welding by gases, may be readily electro-welded into tubing form. It is to be noted that in accordance with the invention the strip edges are overlapped and welded at the crest of the tubing corrugations. The flexibility of corrugated metal hose is primarily due to the flexibility of the trough portions of the corrugations. Crest welding does not impair this flexibility and a flexible hose of satisfactory elasticity results. Crest welding, as distinguished from trough welding, also permits the use of a wide electrode roller 21, thus increasing the electrode life. Further, the annealing effect of the welding heat on the tubing lower side walls adjacent the tubing trough is eliminated. In trough welding while the trough may be made of double thickness whereby to increase the trough strength, the adjacent lower side walls which are also subjected to considerable bending during tube flexure remain of single thickness, and are weakened due to the annealing effect of the trough welding temperature. Accordingly, contrary to what might ordinarily be supposed, trough welding produces a resultant weakened structure. The crest welding, as herein set forth, also permits the tube to be initially welded into substantially its completed shape. This avoids any stressing or stretching of the metal structure such as results if the strip is trough-welded, for example, in extended or elongated position and thereafter compressed into completed shape.

The present invention also provides in the use of the calibrating rollers 22 and 23, a very satisfactory means for insuring the easy removal of the arbor from the completed tubing. As shown in Fig. 5, the calibrating rollers completely free the crest of the tubing from the top of the arbor screw thread 18, facilitating arbor removal without sticking or friction of the parts. While the tubing side walls are brought into engagement with the side walls of the arbor screw thread, the elasticity of flexible tubing in an axial direction is high and accordingly the side wall pressure against the sides of the screw thread is negligible and does not impair the ready removal of the arbor from the tubing.

It is obvious that various changes and additions may be made in the apparatus and process steps heretofore specifically set forth without departing from the spirit of the invention. For example means may be incorporated for automatically moving the welding roller 21 and the calibrating rollers 22 and 23 into and out of engagement with the strip convolutions on the arbor at the beginning and end of the welding operation. Also, means may be provided for switching on and off the welding current in synchronized relation to the rotation of the arbor in welding direction. Accordingly the invention is not to be limited to the precise embodiment, apparatus and method steps heretofore specifically set forth, but only as indicated in the following claims.

The invention is hereby claimed as follows:

1. The method of making flexible metal tubing which comprises helically winding an elongated profiled metal strip upon a profiled arbor with the strip edges in juxtaposed relation, the profiling of the strip conforming generally to the profiling of the arbor, welding the strip edges together whereby to form the tubing, reshaping the tubing by adjusting the contour of the strip profile with respect to the profiling of the arbor while the tubing remains on the arbor, and thereafter removing the tubing from the arbor.

2. An apparatus for making flexible metal tubing comprising an elongated profiled arbor upon which an elongated profiled metal strip is adapted to be helically wound with its edges in juxtaposed relation, the profiling of the arbor conforming generally to the profiling of the strip, a welding electrode adapted to contact and weld the juxtaposed strip edges, means for rotating the arbor and for relatively translating the arbor and the welding electrode axially of the arbor whereby to permit the welding electrode to continuously engage the strip edges and effect the welding operation, and a calibrating member adapted to engage and reshape the strip with respect to the profiling of the arbor after the welding operation, said calibrating member having means thereon for lifting certain strip portions out of contact with the arbor whereby to facilitate the removal of the tubing from the arbor.

3. An apparatus for making flexible metal tubing comprising an elongated profiled arbor upon which an elongated profiled metal strip is adapted to be helically wound with its edges in juxtaposed relation, the profiling of the arbor conforming generally to the profiling of the strip, a welding electrode adapted to contact and weld the juxtaposed strip edges, and means for rotating the arbor and for relatively translating the arbor and the welding electrode axially of the arbor whereby to permit the welding electrode to continuously engage the strip edges and effect the welding operation.

4. An apparatus for making flexible metal tubing comprising an elongated profiled arbor upon which an elongated profiled metal strip is adapted to be helically wound with its edges in juxtaposed relation, the profiling of the arbor conforming generally to the profiling of the strip, a welding electrode adapted to contact and weld the juxtaposed strip edges, means for rotating the arbor and for relatively translating the arbor and the welding electrode axially of the arbor whereby to permit the welding electrode to continuously engage the strip edges and effect the welding operation, and a calibrating member adapted to engage and reshape the strip with respect to the profiling of the arbor after the welding operation.

5. An apparatus for making flexible metal tubing comprising an elongated profiled arbor upon which an elongated profiled metal strip is adapted to be helically wound with its edges in overlapping relation, the profiling of the arbor conforming generally to the profiling of the strip, a welding roller adapted to contact and weld the overlapped strip edges, means for rotating the arbor and for relatively translating the arbor and the welding roller axially of the arbor whereby to permit the welding roller to continuously engage the strip edges and effect the welding operation, and a calibrating roller adapted to engage and reshape the strip with respect to the profiling of the arbor after the welding operation, said calibrating roller having means thereon adapted to force vertically disposed strip portions into contact with the arbor and withdraw horizontally disposed strip portions out of contact with the arbor whereby to facilitate removal of the tubing from the arbor.

6. An apparatus for making flexible metal tubing comprising an elongated arbor upon which a profiled elongated metal strip is adapted to be helically wound with its edges in overlapping relation, a screw thread formed on the arbor conforming generally to and adapted to interlock with the profiling of the strip, a welding roller adapted to contact and weld the overlapped strip edges, a stationary support member for the arbor having a screw threaded bore adapted to interengage with the screw thread of the arbor, and means for rotating the arbor whereby to both rotate and translate the arbor axially relative to the welding roller whereby to permit the welding roller to continuously engage the strip edges and effect the welding operation.

7. An apparatus for making flexible metal tubing comprising an elongated arbor upon which a profiled elongated metal strip is adapted to be helically wound with its edges in overlapping relation, a screw thread formed on the arbor conforming generally to and adapted to interlock with the profiling of the strip, a welding roller adapted to contact and weld the overlapped strip edges, a stationary support member for the arbor having a screw threaded bore adapted to interengage with the screw thread of the arbor, means for rotating the arbor whereby to both rotate and translate the arbor axially relative to the welding roller whereby to permit the welding roller to continuously engage the strip edges and effect the welding operation, means for reshaping the strip with respect to the configuration of the screw thread while the strip is on the arbor, and means for reversely rotating the arbor whereby to unscrew the same from the completed tubing.

8. The method of making flexible metal tubing which comprises helically winding an elongated profiled metal strip upon an elongated profiled arbor with the strip edges in juxtaposed relation upon a predetermined engagement surface of the arbor profile, the profiling of the strip conforming generally to the profiling of the arbor, and welding the strip edges together whereby to form the tubing.

9. The method of making flexible metal tubing which comprises helically winding a U-shaped metal strip upon a profiled arbor with the strip edges in overlapping relation upon the crest of the arbor profile and with the trough portions of the strip in spaced relation to the side walls of the arbor profile, and welding the strip edges together whereby to form the tubing.

10. The method of making flexible metal tubing which comprises helically winding a U-shaped metal strip upon a profiled arbor with the strip edges in overlapping relation upon the crest of the arbor profile and with the trough portions of the strip in spaced relation to the side walls of the arbor profile, welding the strip edges together whereby to form the tubing, and thereafter reshaping the strip to withdraw the welded edges from the crest of the arbor profile whereby to facilitate the removal of the tubing from the arbor.

11. The method of making flexible metal tubing which comprises helically winding a U-shaped metal strip upon a profiled arbor with the strip edges in juxtaposed relation upon the crest of the arbor profile and with the trough portions of the strip in spaced relation to the side walls of the arbor profile, welding the strip edges together whereby to form the tubing, and thereafter compressing the trough portions of the strip into contact with the side walls of the arbor profile to withdraw the welded strip edges from the crest of the arbor profile and facilitate the removal of the tubing from the arbor.

ALBERT DREYER.